(12) United States Patent
Telefus et al.

(10) Patent No.: US 6,894,911 B2
(45) Date of Patent: *May 17, 2005

(54) METHOD OF DRIVING A POWER CONVERTER BY USING A POWER PULSE AND A SENSE PULSE

(75) Inventors: Mark D. Telefus, Orinda, CA (US); Mark R. Muegge, Cupertino, CA (US); Charles R. Geber, Woodside, CA (US); Dickson T. Wong, Burlingame, CA (US)

(73) Assignee: iWatt, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/306,780

(22) Filed: Nov. 27, 2002

(65) Prior Publication Data

US 2003/0128018 A1 Jul. 10, 2003

Related U.S. Application Data

(63) Continuation-in-part of application No. 09/970,849, filed on Oct. 3, 2001, now abandoned, which is a continuation-in-part of application No. 09/679,949, filed on Oct. 4, 2000, now Pat. No. 6,304,473, which is a continuation-in-part of application No. 09/585,928, filed on Jun. 2, 2000, now Pat. No. 6,275,018.
(60) Provisional application No. 60/335,723, filed on Nov. 29, 2001.

(51) Int. Cl.[7] .......................... H02M 3/24; H02M 5/42; H02M 7/44; H02M 7/68
(52) U.S. Cl. .................. 363/97; 363/21.05; 363/21.13; 323/222; 323/283
(58) Field of Search ................................. 323/222, 282, 323/283; 363/21.04, 21.05, 21.08, 21.1, 21.11, 21.12, 21.13, 21.16, 21.18, 97

(56) References Cited

U.S. PATENT DOCUMENTS

| 4,589,051 A | 5/1986 | Santurtun et al. |
| 4,597,026 A | 6/1986 | Santurtun et al. |
| 4,819,144 A | 4/1989 | Otake |

(Continued)

FOREIGN PATENT DOCUMENTS

| EP | 841740 A1 A2 | 5/1998 |
| EP | 942518 A2 A3 | 9/1999 |
| EP | 1124315 A1 | 8/2001 |
| WO | WO 98/44622 | 10/1998 |

OTHER PUBLICATIONS

TNY253/254/255, TinySwitch™ Family Energy Efficient, Low Power Off–Line Switchers, Power Integrations, Inc. Feb. 1999, pp. 1–16.

Primary Examiner—Jeffrey Sterrett
(74) Attorney, Agent, or Firm—Fenwick & West LLP

(57) ABSTRACT

A method of regulating voltage at an output of a switching power converter, the converter comprising a switch and pulse generation circuitry, the pulse generation circuitry producing one or more drive signals for cycling the switch ON and OFF, wherein if the switch is cycled ON and OFF according to a cycle of a drive signal, power is transferred from a source to a load. The method includes sensing an output voltage feedback signal, comparing the sensed feedback signal to a reference at a determined time during a cycling of the switch, and regulating an output voltage at the load by controlling whether a cycle of one of the drive signals cycles the switch in response to the comparison.

2 Claims, 11 Drawing Sheets

U.S. PATENT DOCUMENTS

| | | | |
|---|---|---|---|
| 4,975,820 A | 12/1990 | Szepesi | |
| 5,028,861 A | 7/1991 | Pace et al. | |
| 5,146,398 A | 9/1992 | Vila-Masot et al. | |
| 5,189,599 A | 2/1993 | Messman | |
| 5,272,614 A * | 12/1993 | Brunk et al. | 363/21.05 |
| 5,276,604 A | 1/1994 | Messman | |
| 5,285,366 A | 2/1994 | Zaretsky | |
| 5,313,381 A | 5/1994 | Balakrishnan | |
| 5,479,090 A | 12/1995 | Schultz | |
| 5,565,761 A | 10/1996 | Hwang | |
| 5,570,276 A | 10/1996 | Cuk et al. | |
| 5,629,841 A | 5/1997 | Attwood | |
| 5,680,034 A | 10/1997 | Redl | |
| 5,747,977 A | 5/1998 | Hwang | |
| 5,764,039 A | 6/1998 | Choi et al. | |
| 5,804,950 A | 9/1998 | Hwang et al. | |
| 5,815,380 A | 9/1998 | Cuk et al. | |
| 5,822,200 A | 10/1998 | Stasz | |
| 5,828,558 A | 10/1998 | Korcharz et al. | |
| 5,831,418 A | 11/1998 | Kitagawa | |
| 5,841,643 A | 11/1998 | Schenkel | |
| 5,862,045 A | 1/1999 | Halamik et al. | |
| 5,886,586 A | 3/1999 | Lai et al. | |
| 5,886,885 A | 3/1999 | Fujie | |
| 5,892,355 A | 4/1999 | Pansier et al. | |
| 5,932,938 A | 8/1999 | Shimamori | |
| 5,949,229 A | 9/1999 | Choi et al. | |
| 6,020,729 A * | 2/2000 | Stratakos et al. | 323/283 |
| 6,049,471 A | 4/2000 | Korcharz et al. | |
| 6,087,816 A | 7/2000 | Volk | |
| 6,115,274 A | 9/2000 | Mao | |
| 6,181,583 B1 | 1/2001 | Okui et al. | |
| 6,208,528 B1 | 3/2001 | Soto et al. | |
| 6,246,220 B1 * | 6/2001 | Isham et al. | 323/224 |
| 6,275,018 B1 | 8/2001 | Telefus et al. | |
| 6,304,473 B1 | 10/2001 | Telefus et al. | |
| 6,307,356 B1 * | 10/2001 | Dwelley | 323/282 |
| 6,396,250 B1 * | 5/2002 | Bridge | 323/283 |
| 6,597,159 B2 * | 7/2003 | Yang | 323/283 |

\* cited by examiner

METHOD OF DRIVING A POWER CONVERTER BY USING A POWER PULSE AND A SENSE PULSE

RELATED APPLICATION DATA

This application is a continuation-in-part of application Ser. No. 09/970,849, filed Oct. 3, 2001, now abandoned which is a continuation-in-part of application Ser. No. 09/679,949, filed on Oct. 4, 2000, now U.S. Pat. No. 6,304,473, which is a continuation-in-part of application Ser. No. 09/585,928, filed Jun. 2, 2000, now U.S. Pat. No. 6,275,018, each of which is fully incorporated herein by reference. This application also claims priority to provisional application Ser. No. 60/335,723, filed Nov. 29, 2001, which is fully incorporated herein by reference.

FIELD OF INVENTION

The invention pertains generally to the field of power conversion and more particularly to methods for controlling power converters.

BACKGROUND

Switching power converters offer both compactness and efficiency in a number of different topologies that can be placed in two main categories: isolated (or transformer-coupled) and non-isolated (or direct-coupled). In non-isolated switching power converters, such as a buck (reducing voltage) or boost (increasing voltage) converter, the power output is directly coupled to the power input through the power switch element. In contrast, in isolated power converters, such as flyback or forward converters, the power output is isolated from the power input through a transformer, with the power switch element located on the primary (input) side of the transformer.

In either type of converter, typical analog control systems use pulse width modulation (PWM), pulse frequency modulation (PFM), or a combination thereof to control the duty cycle of the power switch within the converter.

Consider, for example, the flyback converter 10 of FIG. 1. The converter 10 includes a power switch Q1 (typically a field effect transistor (FET)) coupled to an input voltage, $V_{in}$, via a primary winding 20 of a power transformer T1. A rectifying diode D1 and filter capacitor C1 are coupled to a secondary winding 22 of the transformer T1. The converter 10 includes a pulse modulating controller 25 that outputs a drive signal 61 to turn ON the power switch Q1 in order to control an output voltage, $V_{out}$, across a load 24. A primary/secondary isolation circuit 30 provides an output voltage feedback signal that approximates the output voltage across load 24. An error voltage sense circuit 31 generates an error voltage from inputs that include a reference voltage, $V_{REF}$, as well as the output voltage feedback signal from primary/secondary isolation circuit 30. This error voltage is used by the controller 25 for regulating the ON time of the power switch Q1.

Obtaining the output voltage feedback signal from the secondary side of the converter, as shown in FIG. 1, offers the potential of accurate regulation performance, but necessarily increases the complexity and cost of the control system. If a primary-side feedback system were used instead, the output voltage feedback signal would be obtained from the primary side of power transformer T1, reducing cost and complexity of the control system, but introducing difficulties with regulation accuracy.

In particular, a reflected voltage across the primary winding 20 is proportional to the output voltage across the load 24 minus a voltage drop produced by resistive and other losses in the secondary circuit, including losses across the rectifying diode D1. These losses will vary, depending upon the current drawn by the load and other factors. Hence, measuring the output voltage through the reflected flyback voltage is problematic, as parasitic losses act as a corrupting signal that cannot be removed by filtering. As such, prior art primary-side feedback systems, such as that disclosed in U.S. Pat. No. 5,438,499, which depends upon the reflected voltage, are challenged to provide good voltage regulation.

Accordingly, there is a need in the art for power converters having primary-only feedback that achieves regulation performance traditionally obtainable with secondary feedback, while preserving the intended simplicity and cost benefits of primary-only feedback.

SUMMARY OF ASPECTS OF THE INVENTION

In accordance with one aspect of the invention, methods for regulating voltage at an output of a switching power converter having a power switch using primary-only feedback are provided. In one implementation, the method includes sensing an output voltage feedback signal, comparing the sensed feedback signal to a reference at a determined time during a cycling of the switch, and regulating the output voltage at a load by controlling whether a cycle of one or more drive signals produced by pulse generation circuitry should cycle a switch, in response to an output of the comparison. In exemplary implementations, the comparison is accomplished by one of binary comparison logic, ternary comparison logic and signed digital comparison logic.

The methods may be used in conjunctions with both transformer-coupled and direct-coupled converters. By way of example, in one implementation, the converter is transformer-coupled having its output coupled through a rectifying element, with the feedback signal originating from the primary side of the converter. In one embodiment of this implementation, the determined time is when the feedback signal corresponds to the output voltage at the load plus a small, substantially constant voltage drop measured from cycle to cycle of the switch. In another embodiment of this implementation, the determined time is when current flowing through a secondary rectifying element is small and substantially constant from cycle to cycle of the switch.

In one implementation, the converter is a flyback topology, the feedback signal is a reflected flyback voltage signal, and the determined time is a fixed backward offset time from the transformer flux reset point.

In another implementation, the converter is a forward converter, the output voltage feedback signal is a reflected voltage across an auxiliary winding coupled to the output inductor, and the determined time is at a fixed backward offset time from a point of output inductor flux reset.

In yet another implementation, the converter is a direct-coupled boost converter, the output voltage feedback signal corresponds to a voltage across the switch during its OFF time, and the determined time is at an instant when current through a rectifying element is small and substantially constant from cycle to cycle of the switch.

In still another implementation, the converter is a direct-coupled buck converter, the output voltage feedback signal corresponds to a differential voltage across an output inductor during the off time of the high-side switch, and the determined time is at an instant when current through a rectifying element is small and substantially constant from cycle to cycle.

In selected implementations, the pulse generation circuitry includes a first pulse generator for producing a first drive signal for cycling the switch ON and OFF, wherein if the switch is cycled ON and OFF according to a cycle of the first drive signal, a power pulse is transferred from the source to the load, and a second pulse generator for producing a second drive signal for cycling the switch ON and OFF, wherein if the switch is cycled ON and OFF according to a cycle of the second drive signal, a sense pulse is transferred from the source to the load, the power transferred to the load by a sense pulse being substantially less than the power transferred to the load by a power pulse, the converter including a controller which enables cycling of the switch by a cycle of a power pulse, sense pulse, or neither, in response to the comparison. In some embodiments, the controller make take into account comparisons from one or more previous switch cycles in determining whether to enable cycling of the switch by a cycle of a power pulse, sense pulse, or neither, in response to a present comparison.

Other and further aspects and embodiments of the invention will become apparent upon review of the accompanying figures and the following detailed description.

BRIEF DESCRIPTION OF THE DRAWINGS

The various aspects and features of the invention will be better understood by examining the figures, in which similar elements in different embodiments are given the same reference numbers for ease in illustration, and in which.

DETAILED DESCRIPTION OF EMBODIMENTS

It will be apparent to those skilled in the art that the power converter control system methodologies and embodiments disclosed and described herein may be applied to transformer-coupled switching converters, such as a flyback, forward, fly-forward, push-pull, or bridge-type power converters. In addition, as will be explained herein, direct-coupled switching power converters such as buck, boost, buck/boost or SEPIC power converters may also benefit from these control methodologies and embodiments.

The above-incorporated U.S. Pat. No. 6,275,018 discloses and describes various embodiments of a "pulse rate" (also referred to as "pulse train") method of power converter regulation. Notably, pulse rate regulation, in itself, controls neither the ON TIME nor the OFF TIME of the power switch in order to regulate the output voltage. Instead, output regulation may be accomplished by controlling the rate of independently specified activation pulses presented to the power switch. If the load requires more power, pulses from a pulse generator are allowed to cycle the power switch. Otherwise, pulses from the pulse generator are inhibited from cycling the power switch.

In one embodiment, this decision is made on a pulse-by-pulse basis. Accordingly, pulse rate regulation resembles a digital ("bang-bang") servo control method, driving the output voltage toward a reference voltage in discrete steps. As a consequence, in the presence of a fixed load, the output voltage will "limit cycle" about the reference.

In contrast, prior art analog control methods (e.g., PWM and PFM) endeavor to construct pulses that will drive the output voltage onto the reference. In this case, owing to practical limits on the width and frequency of pulses, in the presence of a fixed load, the output voltage will "ripple" about the reference. Because pulse rate control parameters (i.e., phase, width, and frequency) are specified independently of regulation, pulse rate regulation presents the opportunity to realize numerous power stage optimizations obtained at the price of exchanging "ripples" for "limit cycles."

The present application discloses pulse rate regulated isolated power converters with primary-only feedback. Compared to secondary feedback, with its costly opto-isolator circuit and attendant demands on circuit board layout, primary-only feedback offers the potential of cheaper, slimmer power supplies for applications such as consumer electronics.

Figure 1:
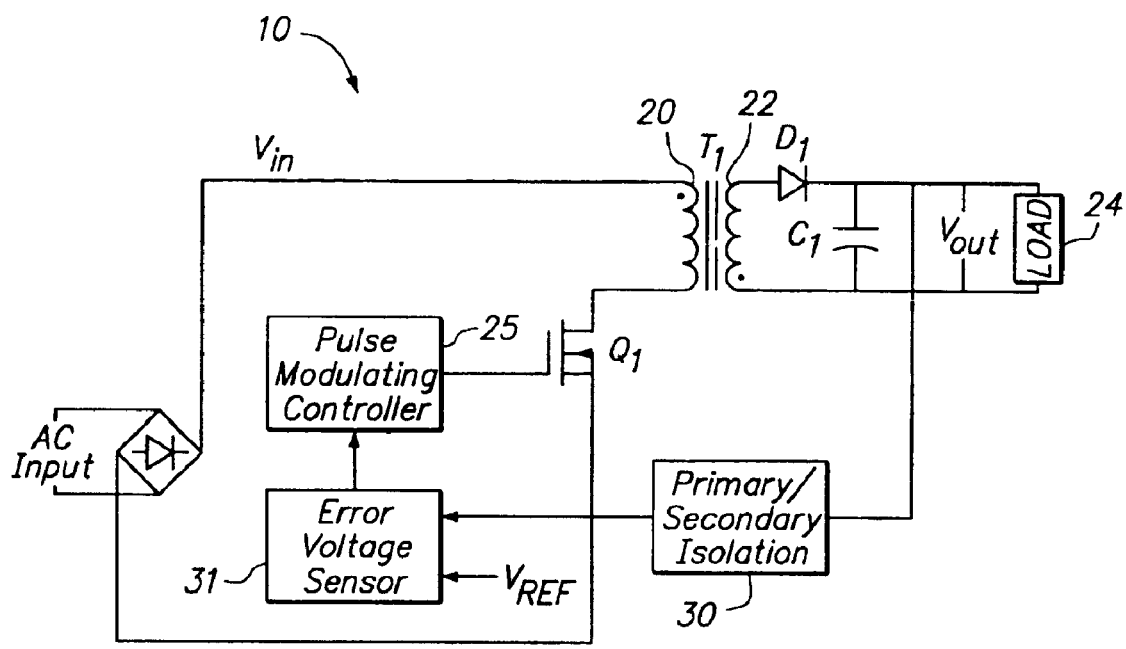
FIG. 1 is a block diagram illustrating a flyback converter with a pulse modulating controller.
Figure 2:
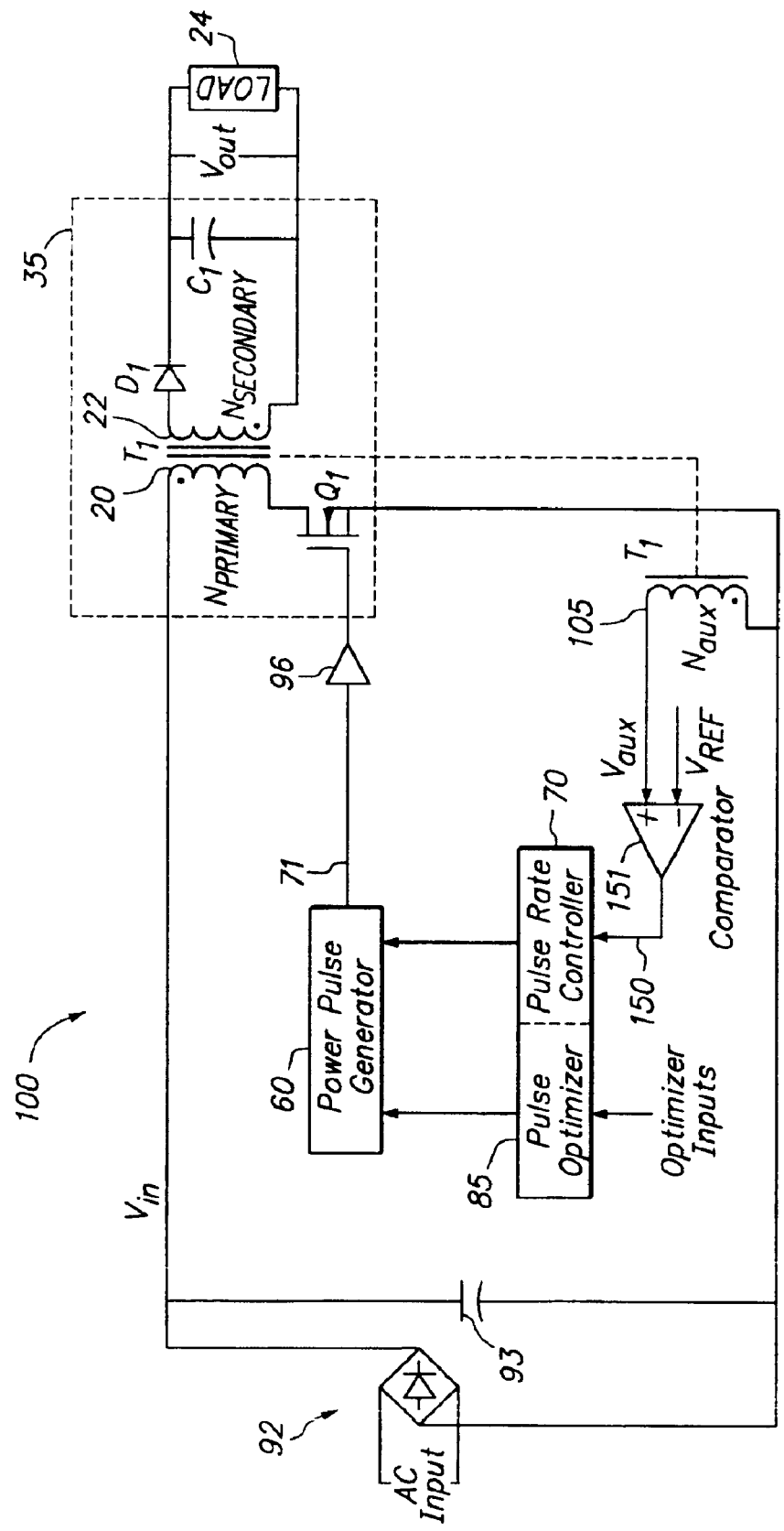
FIG. 2 illustrates a pulse rate controlled flyback converter having primary-only feedback according to one embodiment of the invention.

FIG. 2 illustrates a flyback power converter 100 employing primary-only feedback for regulation purposes. The converter 100 includes a power stage 35, which comprises a transformer T1 having a primary winding 20 and secondary winding 22, rectifying diode D1 and filter capacitor C1. Power stage 35 receives an input voltage, $V_{in}$, produced by a rectifier 92 operating on an AC line input. A capacitor 93 helps smooth voltage ripple on $V_{in}$. A power pulse generator 60 generates a power pulse drive signal 71 that, under the control of a pulse rate controller 70, cycles switch Q1. As illustrated, switch Q1 may be a power MOSFET. Alternatively, switch Q1 may comprise multiple transistors or other suitable means.

Instead of controlling the ON TIME and OFF TIME of switch Q1, based on a feedback signal corresponding to the output voltage, the pulse rate controller 70 determines whether or not a given cycle of drive signal 71 shall cycle switch Q1. The ON TIME of for each cycle of drive signal 71 is of such a duration that, when switch Q1 is cycled OFF during a single cycle of drive signal 71, the power stage 35 will transfer a significant pulse of power to the load 24. As will be described in greater detail herein, the controller 70 may incorporate pulse optimizing circuitry ("pulse optimizer") 85. Based on certain optimizer inputs, the pulse optimizer 85 for determining one or both of the ON and OFF times of a given cycle of the drive signal 71.

The flyback power converter 100 implements a method of primary-only feedback in the following fashion. When switch Q1 is switched OFF following either a power pulse or sense pulse ON time, the voltage on the secondary winding 22 will be "reflected" back onto the primary winding 20 scaled by the turns ratio, $N_P/N_S$, where $N_P$ is the number of turns on the primary winding 20 and $N_S$ is the number or turns on the secondary winding 22. Although the voltage across the primary winding 20 could be sensed to perform primary-only feedback control, a more suitable signal for sensing may be provided through the use of an auxiliary winding 105, as the voltage on this winding 105 is ground referenced. The reflected voltage, $V_{AUX}$, on auxiliary winding 105 will be $N_{AUX}/N_S$ times the voltage on secondary winding 22, where $N_{AUX}$ is the number of turns on auxiliary winding 105, and $N_S$ is the turns on secondary winding 22. The relationship between $V_{AUX}$ and $V_{out}$ is given by the expression $$V_{AUX}=(V_{out}+\Delta V)N_{AUX}/N_S \qquad (1)$$

where $\Delta V$ is the voltage drop caused by resistive and other losses in the secondary circuit. This voltage drop includes, in particular, losses across rectifying diode D1.

One aspect of the present invention leverages the notion that by sampling $V_{AUX}$ at precisely determined instants for which the term $\Delta V$ is small and approximately constant from sample to sample, real-time output voltage feedback can be obtained, where "real-time" output voltage feedback denotes an unfiltered output voltage measurement taken after each power pulse and available to the control logic for the selection of the succeeding drive signal.

A comparator 151 produces an output voltage feedback signal 150 by comparing the $V_{AUX}$ waveform to a reference voltage, $V_{REF}$, calibrated to compensate for the average value of $\Delta V$ at those precisely determined instants when $\Delta V$ is small and substantially constant from cycle to cycle. For example, the reference may be derived from a bandgap voltage reference or other suitable means, such as a compensated zener diode to provide a reliably stable reference voltage. By this calibration of $V_{REF}$, those precisely determined instants define not only the instants at which accurate, real-time output voltage feedback is available, but also the instants at which $V_{AUX}$ and $V_{REF}$ are expected to crossover, resulting in a transition or state change in the output voltage feedback signal 150.

Comparator 151 employed to generate feedback signal 150 can be more or less sophisticated, depending on the amount of information required to insure acceptable regulation. Perhaps the simplest of comparators is the binary comparator, with or without hysteresis, which indicates $V_{AUX}$ is high or low, relative to $V_{REF}$. Slightly more sophisticated is the ternary comparator, which indicates high or low or neither, when the magnitude of the difference between $V_{AUX}$ and $V_{REF}$ is less than some fixed voltage.

Figure 10:
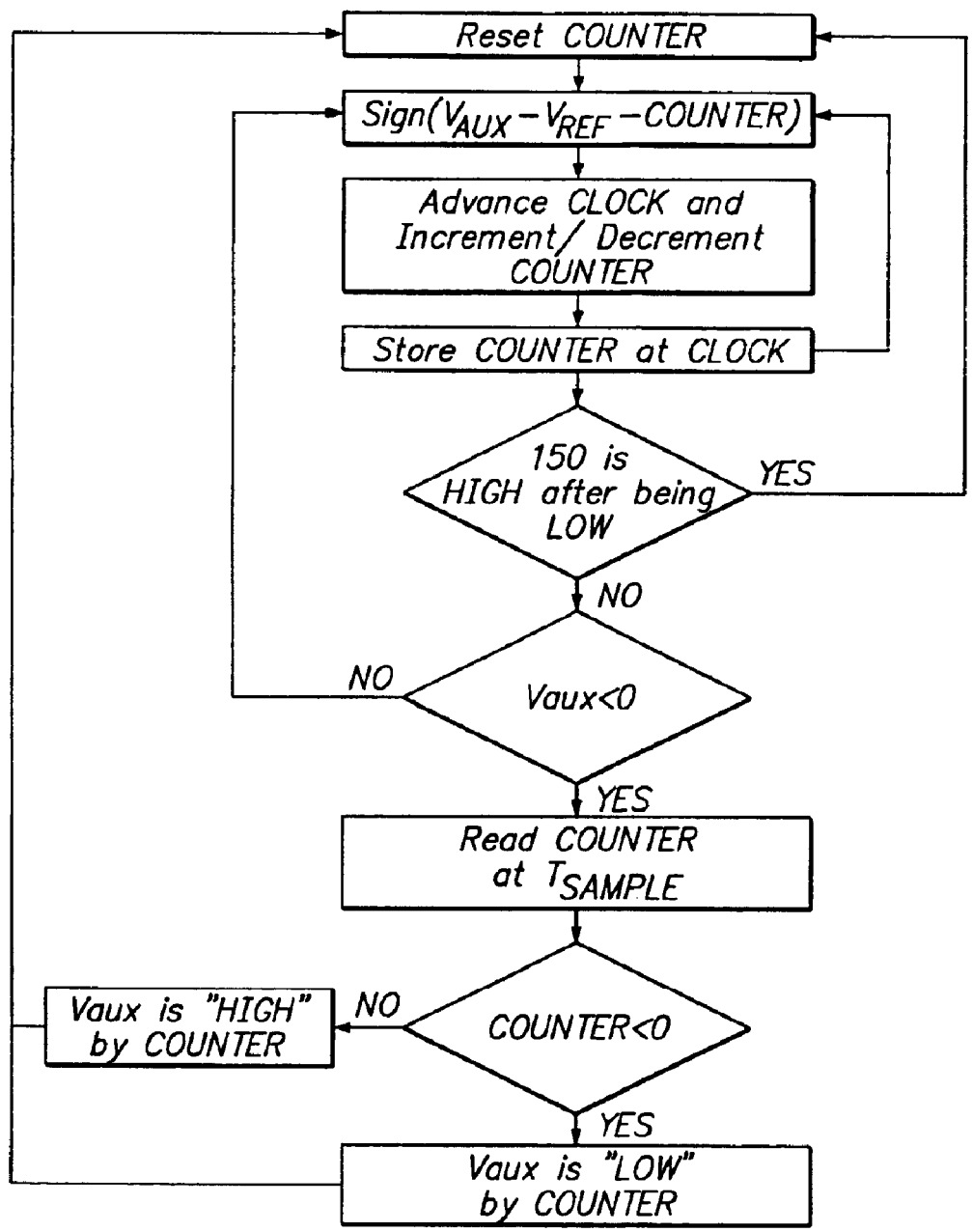
FIG. 10 is a logical flowchart of a signed digital comparator employed in embodiments of the invention.

A still more sophisticated comparator is a signed digital comparator, which provides a high or low indication and, in addition, the magnitude of the difference expressed digitally. FIG. 10 details one embodiment of a signed digital comparator implemented with binary comparators, counters, a digital-to-analog converter, a subtractor, and a minimal amount of control logic, obviating the need for an error amplifier and the sample and hold circuitry characteristic of prior art analog systems. In the example of FIG. 10, under the condition in which $V_{AUX}$ equals $V_{REF}$ at precisely $T_{SAMPLE}$, the comparator may indicate "high" by zero units of voltage. In the embodiments discussed herein, binary comparators without hysteresis are assumed.

Figure 3:
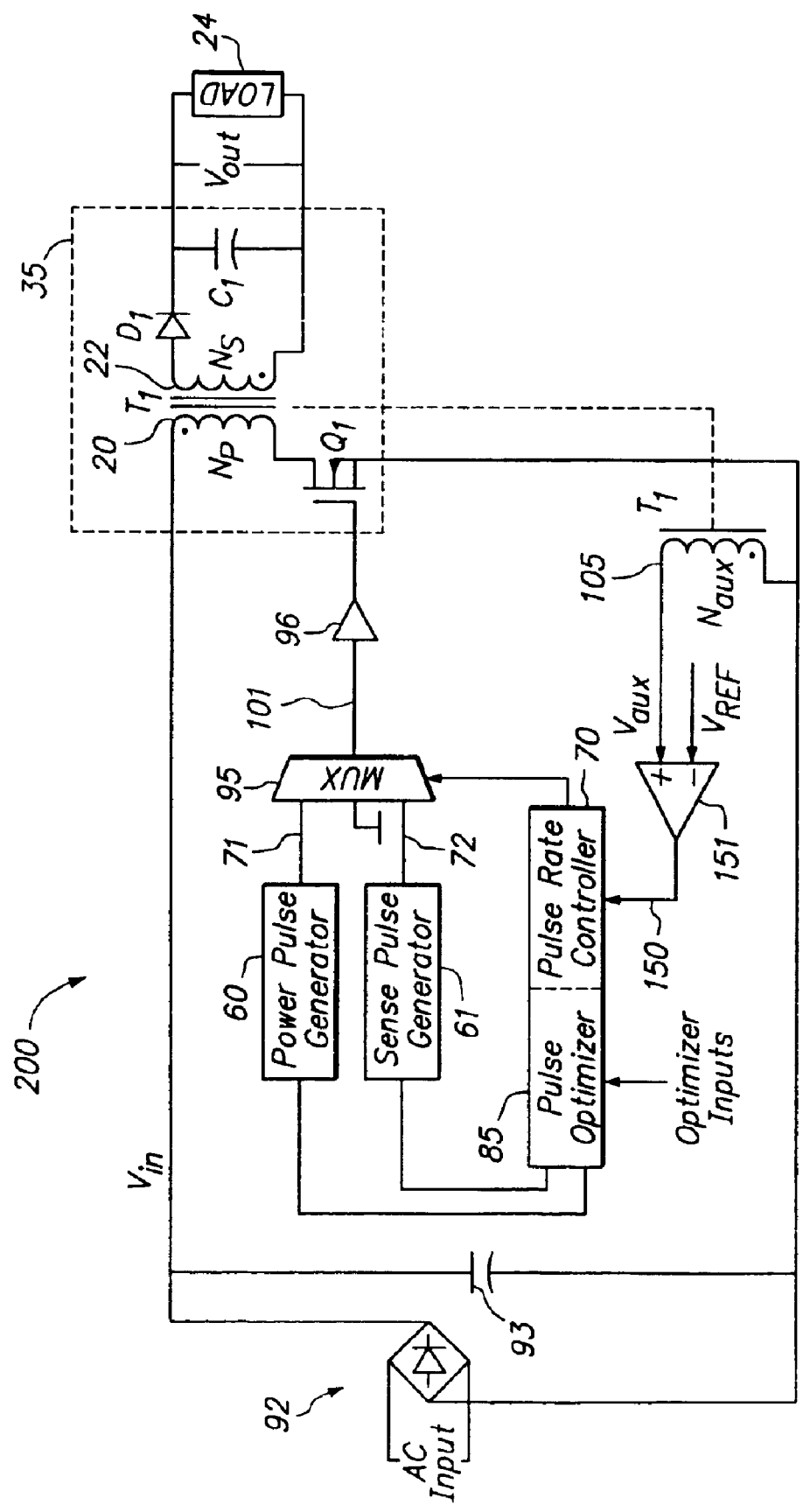
FIG. 3 illustrates a pulse rate controlled flyback converter having primary-only feedback according to another embodiment of the invention.

FIG. 3 illustrates a flyback converter 200 similar to converter 100 of FIG. 2, but with a sense pulse generator 61 in addition to a power pulse generator 60. In this case, switch Q1 may be cycled by pulses of two different durations. The first type of pulse is the previously described "power pulse," wherein switch Q1 switches ON for a duration $T_{ON}$ according to drive signal 71. The second type of pulse, denoted herein as a "sense pulse," is a significantly narrower pulse than a power pulse. To transfer a sense pulse to load 24, the sense pulse generator 61 generates a sense pulse drive signal 72 to drive switch Q1. Because of the reduced ON TIME of switch Q1 when cycled by a sense pulse from drive signal 72, power stage 35 transfers an amount of power to load 24 that is significantly less than that transferred by a power pulse.

As is explained further herein, the power converter 200 is able to use sense pulses from drive signal 72 (as well as power pulses from drive signal 71) to stimulate primary-only feedback information for the pulse rate controller 70. For example, in low load situations, the number of power pulses per unit of time required to maintain regulation is likely to be small. As a consequence, the number of feedback measurements per unit time may be too small to assure prompt response to step changes in load. The incorporation of sense pulse generator 61 (in addition to power pulse generator 60) enables more frequent primary-only feedback information, essential for prompt response to step changes in load, while minimizing power transfer.

To regulate output voltage, $V_{out}$, the pulse rate controller 70 controls whether power pulse generator 60, sense pulse generator 61, or neither, drives switch Q1 by controlling a multiplexer 95. In particular, the multiplexer 95 receives as inputs both drive signals 71 and 72. The multiplexer 95 can select either drive signal 71 or 72, or neither, to provide an input to a driver 96 for a given power switch activation cycle. Driver 96 amplifies the selected signal output by the multiplexer 95, so that switch Q1 may be driven accordingly. In this manner, the controller 70 may control multiplexer 95, such that the power pulse rate occurring at the load 24 is substantially constant, regardless of the pattern of drive signal selection.

Controller 70 may or may not keep history; that is, it may or may not remember the results of previous comparisons, depending on complexity of a particular embodiment. If the controller 70 does keep a history, it may reference the history in the process of deciding whether to choose drive signal 71, drive signal 72, or neither, to cycle the power switch Q1 for a given activation cycle.

Although the power pulse and sense pulse generators 60 and 61 are shown separately in FIG. 3, it will be appreciated that a single pulse generator, comprising, e.g., programmable logic, could be used in place of pulse generators 60 and 61. Moreover, the precise instants in time when the power switch Q1 switches ON and OFF as determined by drive signals 71 and 72 may further be controlled by a pulse optimizer 85, as discussed in greater detail herein.

The flyback converter 200 implements the same method of primary-only feedback as flyback converter 100 in FIG. 2.

Figure 4:
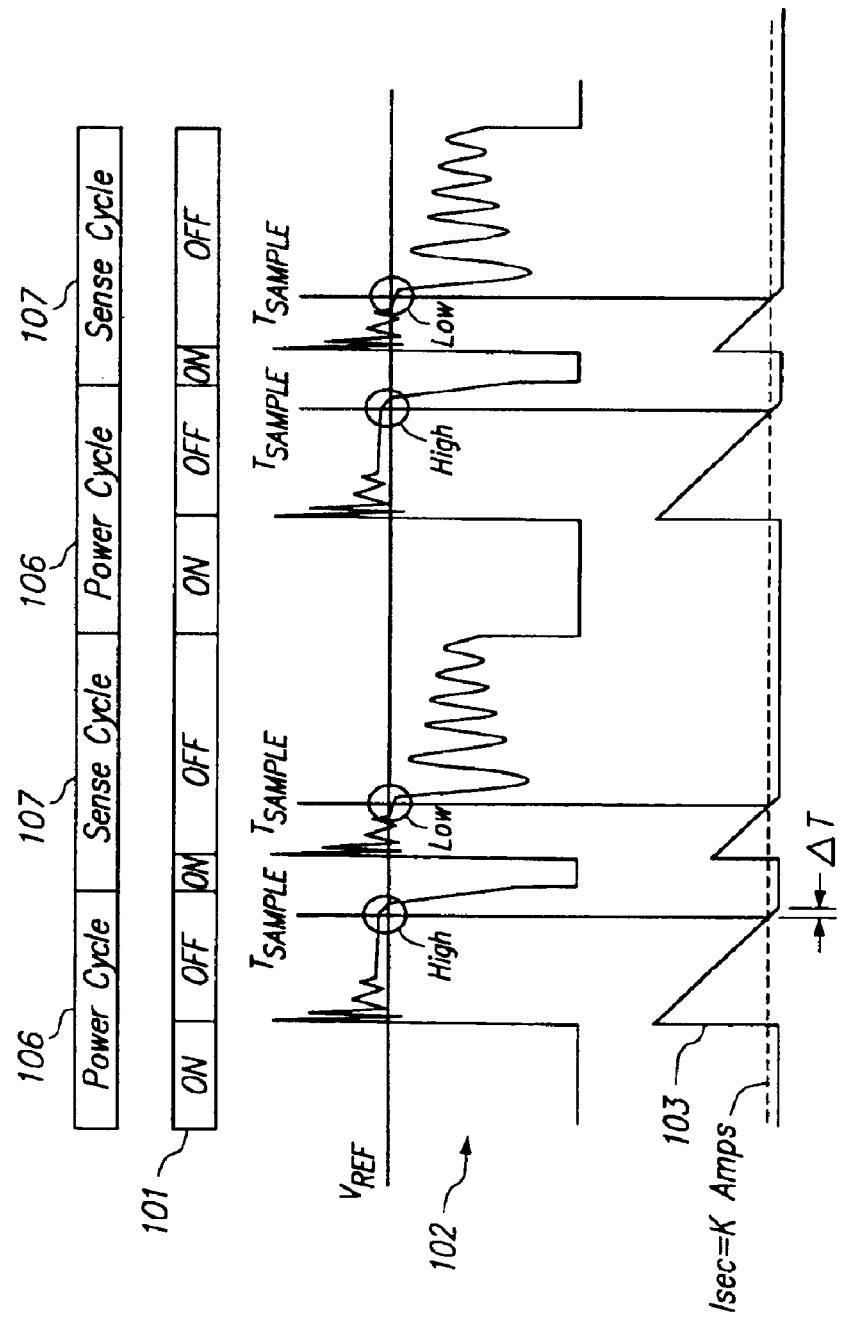
FIGS. 4 and 5 are timing diagrams illustrating a primary-only feedback sampling technique according to embodiments of the invention.
Figure 5:
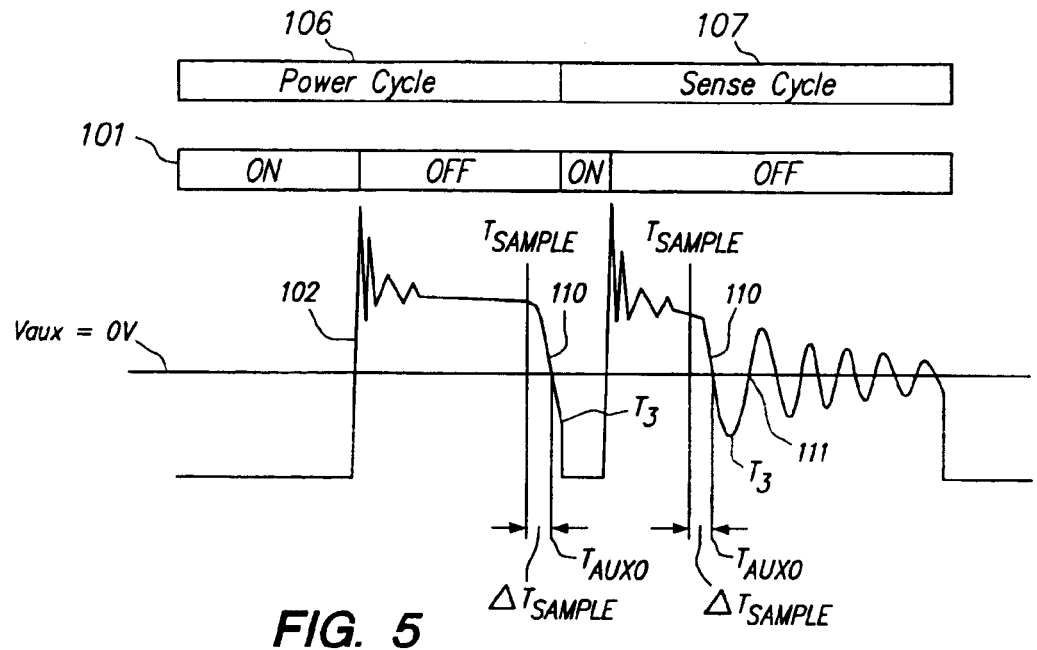

FIG. 4 and FIG. 5 are sampling timing diagrams that illustrate the timing of an exemplary power pulse cycle 106 and a sense pulse cycle 107. Shown are the following waveforms: a) a drive signal 101 to drive the power switch Q1, b) an auxiliary voltage waveform 102, and—in FIG. 4—c) a secondary current $I_{SEC}$ waveform 103 through the rectifying diode D1.

For both a power pulse cycle 106 and a sense pulse cycle 107, the reflected auxiliary voltage waveform 102 swings high when drive signal 101 switches transistor Q1 from ON to OFF. Similarly, $I_{SEC}$ 103 will also jump from a substantially zero current to a relatively high current value, $I_{PEAK}$, when the drive signal 101 switches transistor Q1 from ON to OFF. During drive signal 101 OFF TIME, $I_{SEC}$ 103 will ramp down from this relatively high current value back to a substantially zero current value, assuming discontinuous or critically discontinuous operation. Sampling the binary output signal 150 (FIG. 3) at times when $I_{SEC}$=K Amps, where K=a small and constant value, will insure that the ΔV term in the above-equation (1) remains small and approximately constant from sample to sample.

To implement the foregoing, with reference also to FIG. 3, it suffices to sample binary output signal 150 at time $T_{SAMPLE}$, where $T_{SAMPLE}$ occurs at a fixed backward offset ΔT from the zero points of the secondary current $I_{SEC}$ (for sense pulses and power pulses). This is because the current $I_{SEC}$ decays at the same rate for sense pulses as for power pulses. Note that the reflected voltage waveform 102 forms a "plateau" period of relatively constant voltage while $I_{SEC}$ 103 ramps down to zero current. As $I_{SEC}$ 103 reaches zero current, this plateau voltage drops off steeply. Thus, to get a good reading of the output voltage on load 24 by way of $V_{AUX}$, $T_{SAMPLE}$ should occur within the plateau period, as close to the drop off as possible. Hence ΔT cannot be made too small, or sampling will be complicated by the collapse of the plateau, preventing a proper sensing of the output voltage.

By sampling ΔT time ahead of the zero points of the secondary current (for sense pulses and power pulses), the ΔV term in above-equation (1) is maintained at a small and approximately constant value regardless of line or load conditions, enabling the potential for precise output regulation.

An alternative to direct sensing of the secondary current (an appropriate methodology for single-output converters) is the sensing of the transformer reset condition directly or indirectly. When $I_{SEC}$ 103 reaches zero the transformer T1 may be denoted to be in a reset condition. This reset condition occurs when the energy in the primary winding 20 has been completely transferred to the secondary winding 22. At such a point in time, the voltage across the primary winding 20 will proceed to drop rapidly to zero.

Referring to FIG. 5, it can be seen that at the transformer reset point, the voltage $V_{AUX}$ across the auxiliary winding 105 will also drop rapidly to (and through) zero volts, oscillating around zero until switch ON occurs. Thus, to detect a reset condition, a zero crossing comparator (not illustrated) could monitor $V_{AUX}$ and detect when it first equals zero following either a power pulse cycle 106 or sense pulse cycle 107.

Alternatively, another comparator (not illustrated) could detect when $V_{IN}$ first equals the drain voltage on transistor power switch Q1, $V_{DRN}$, which occurs when $V_{AUX}$ first equals zero. Because the time at which $V_{AUX}$ first equals zero, $T_{AUXO}$, lags transformer reset by a fixed amount of time and is more easily detected, it provides an attractive means for indirectly measuring transformer reset time.

After the transformer has reached reset, there is still energy stored in the drain-source capacitance of transistor Q1, regardless of whether transistor Q1 has been cycled according to drive signal 71 (to produce a power pulse) or drive signal 72 (to produce a sense pulse). Assuming that transistor Q1 is not immediately cycled ON at this point, this energy then resonantly oscillates with the magnetizing inductance of the primary winding 22 at a resonant frequency determined by the capacitance and inductance values. The frequency (or period) of this resonance is substantially the same regardless of whether a sense pulse or power pulse has been sent through power stage 35. The resonant oscillation of $V_{AUX}$ is illustrated in FIG. 4 and FIG. 5.

As seen in FIG. 5, the reflected auxiliary voltage waveform 102 will have a plateau period during the OFF TIME of either a sense pulse cycle 107 or a power pulse cycle 106. A condition in which reflected auxiliary voltage 102 equals zero will occur following this plateau period at time 110. By measuring the time difference between the first zero crossing point of $V_{AUX}$ 110 following the turn OFF of switch Q1, and the second zero crossing point of $V_{AUX}$ 111, it is possible to empirically derive the period of resonant oscillation following flux reset. This empirically derived value of the resonant oscillation period is useful in fixing the setback from $T_{AUXO}$ to the transformer reset point (see below).

The reflected auxiliary voltage 102 achieves its first minimum at a time T3, which occurs midway between times 110 and 111. This first minimum voltage point, or a subsequent minimum, may be advantageously used as the point when the ON period for the next pulse (either a power pulse or a sense pulse) begins. Because the voltage at the drain of transistor Q1 is also a minimum at time T3, the switching stresses and losses are minimized. Although the drain voltage is non-zero at time T3, it may be denoted as the zero-voltage switching time, because this is as close to zero as the drain voltage will get.

With reference again to the converter 200 of FIG. 3, as disclosed and discussed in the above-incorporated U.S. application Ser. No. 09/970,849, U.S. Pat. No. 6,304,473, and U.S. provisional application Ser. No. 60/335,723, the pulse optimizer 85 accepts a variety of optimizer inputs, including $V_{AUX}$, and applies these inputs to derive the timing, etc. of power and sense pulses, in order to realize optimizations such as zero-voltage switching. As the foregoing paragraphs suggest, an effective and easily-mechanized method for implementing zero-voltage switching is first, to detect the first and second zero-crossings of $V_{AUX}$ following the turn off of switch Q1; second, to derive the period of resonant oscillation; and third, to adjust both power and sense pulses to turn on at the first zero-crossing of $V_{AUX}$ ($T_{AUXO}$), plus ¼ of the resonant oscillation period, or $T_{AUXO}$ plus ¼ of the resonant oscillation period plus an integral multiple of resonant oscillation periods.

Where the foregoing method is used to implement zero-voltage switching, the time $T_{AUXO}$ and the period of resonant oscillation generated by the pulse optimizer 85 can both be made available to pulse rate controller 70 for use in the determination of $T_{SAMPLE}$. $T_{SAMPLE}$ could, for example, be determined from $T_{AUXO}$ by first subtracting ¼ of the resonant oscillation period to "locate" the transformer reset point, and then subtracting ΔT. Having determined the sampling time, $T_{SAMPLE}$, controller 70 need only evaluate the binary output signal 150 of comparator 151 to determine whether at that instant $V_{AUX}$ is higher or lower than the expected value, $V_{REF}$.

If $V_{AUX}$ is greater than the reference voltage at the sample time $T_{SAMPLE}$, the binary output signal 150 will be high. In response to sampling a high binary output signal 150 at $T_{SAMPLE}$, the controller 70 may drive multiplexer 95 to select the sense pulse drive signal 72. In this fashion, the following pulse will be a sense pulse so as to transfer as little power to the load 24 as possible to maintain regulation. Alternatively, if $V_{AUX}$ is less than $V_{REF}$ at time $T_{SAMPLE}$, binary output 150 will be low. In response to sampling a low binary output signal 150 at $T_{SAMPLE}$, controller 70 may drive multiplexer 95 to select the power pulse drive signal 71. As a result, the following pulse through power stage 35 will be a power pulse so that the maximum amount of power can be transferred to load 24 to maintain regulation. In this fashion, the output voltage $V_{out}$ across load 24 will be a function of the value of $V_{REF}$.

An alternative to sampling the binary output signal 150 at time $T_{SAMPLE}$ is to sample signal 150 periodically to detect the high to low transitions or state changes of said signal, and classify them as "early" or "late" relative to $T_{SAMPLE}$, where an "early" transition is one that occurs before $T_{SAMPLE}$, and a "late" transition is one that occurs after $T_{SAMPLE}$. This follows from the fact that $T_{SAMPLE}$ is, by definition, the expected crossover point of $V_{AUX}$ with $V_{REF}$, and therefore the expected transition point of binary output signal 150.

Figure 5A:
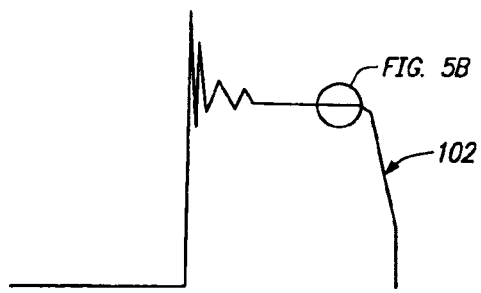
FIGS. 5A and 5B provide greater detail of aspects demonstrated in the timing diagrams in FIGS. 4 and 5.
Figure 5B:
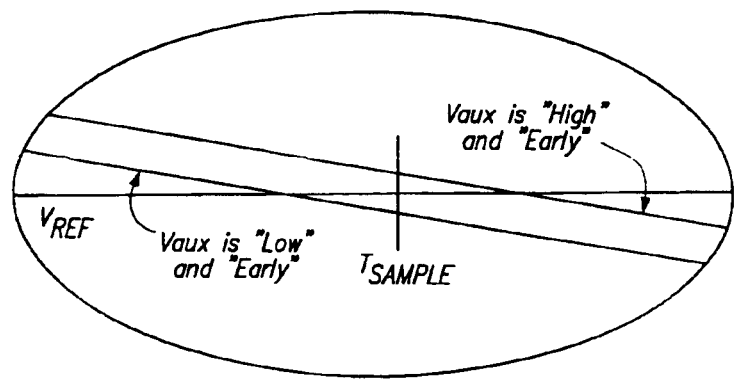

As illustrated in FIGS. 5A and 5B, a high to low transition of output signal 150 corresponds to $V_{AUX}$ crossing $V_{REF}$ from above. In particular, FIG. 5A illustrates the "equivalence" between the condition in which $V_{AUX}$ crosses $V_{REF}$ "early" (relative to $T_{SAMPLE}$) and the condition in which binary output signal 150 is "low" at $T_{SAMPLE}$. Similarly, the condition in which $V_{AUX}$ crosses $V_{REF}$ "late" (or not at all) corresponds to the condition in which binary output signal 150 is "high" at $T_{SAMPLE}$.

Notably, an early/late detector can be more or less sophisticated, depending on the amount of information required to insure acceptable regulation. Perhaps the simplest of early/late detectors is a binary detector, which indicates early or late, relative to $T_{SAMPLE}$. Slightly more sophisticated is the ternary detector, which indicates early, late, or neither, when the magnitude of the earliness or lateness is less than some fixed interval of time. A still more sophisticated early/late detector is a signed digital detector, which provides an early or late indication and, in addition, the magnitude of the earliness or lateness expressed digitally.

Figure 11:
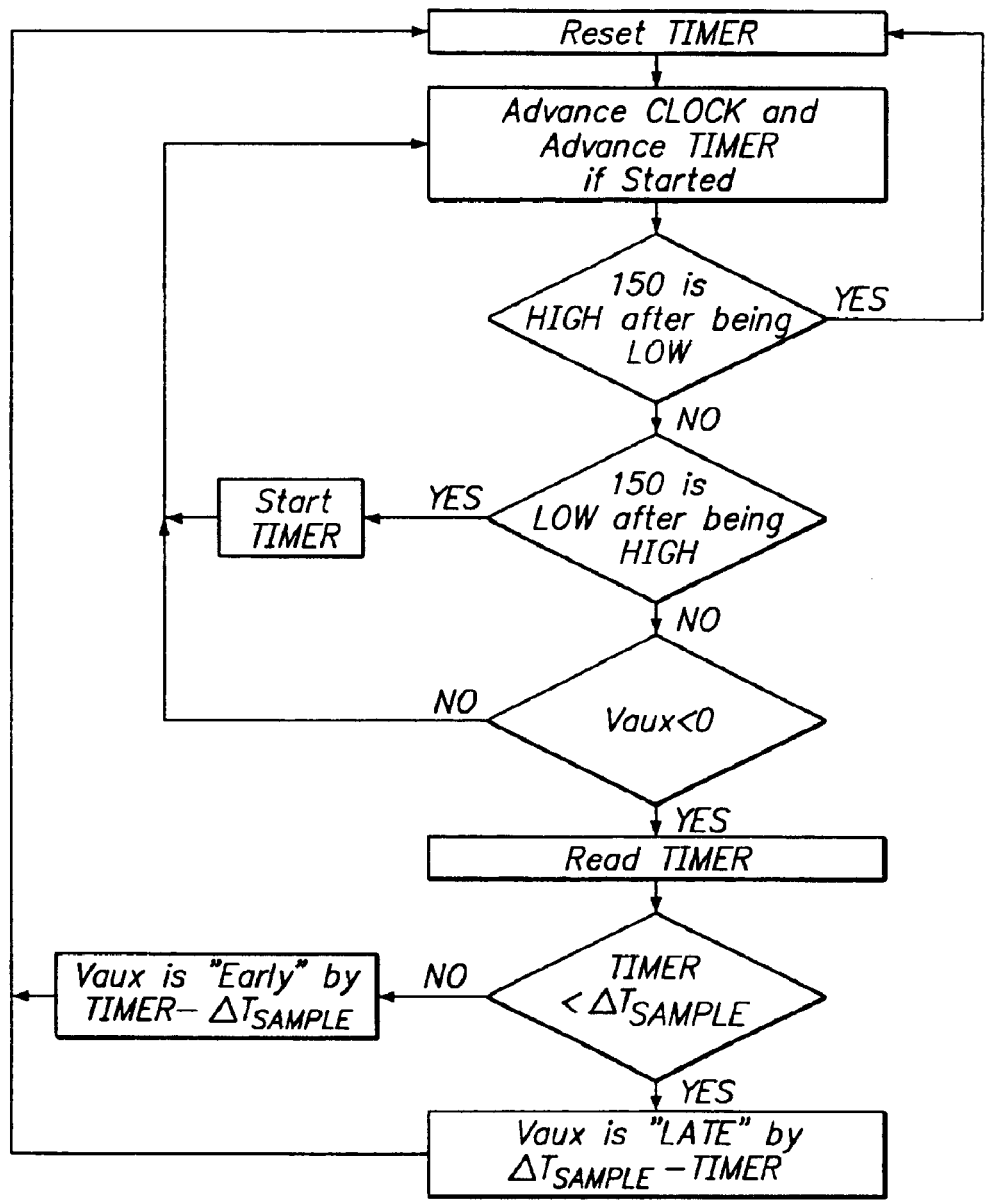
FIG. 11 is a logical flowchart of a signed digital early/late detector employed in embodiments of the invention.

FIG. 11 illustrates one embodiment of a signed digital early/late detector implemented with binary comparators, counters, a subtractor, and a minimal amount of control logic, obviating the need for an error amplifier and the sample and hold circuitry characteristic of prior art analog systems. In the embodiment of FIG. 11, a transition of binary output signal 150 that occurs at precisely $T_{SAMPLE}$ will be classified (by the detector) as "early" by zero units of time.

Sense pulses play an important role in the output voltage regulation scheme. Since output voltage feedback is based on the reflected voltage across the transformer T1, either a sense or power pulse must be sent in order for a sample of the output voltage to be obtained. Because the amount of energy transferred to the load is significantly lower than that of power pulses, sense pulses allow for a greater number of samples of the output voltage to be taken without adversely impacting output regulation. The more frequently the output is sampled, the better the regulation and the better the response to step changes in load.

When the load 24 becomes very light or is removed from the flyback converter 200 of FIG. 3, the pulse rate controller 70 would be expected to command a continuous train of sense pulses 107 for transmission through power stage 35. Although the energy content of sense pulses is small compared to that of power pulses, in the absence of load 24, it is possible that the output voltage $V_{out}$ will still rise to a level above the desired regulation set point. As such, in order to maintain good regulation under low-load or no-load conditions, it may be desirable in embodiments of the controller 70 to incorporate a "skip mode" of operation, wherein controller 70 inhibits pulsing of the switch Q1 for short periods by causing multiplexer 95 to select neither the power pulse drive signal 71 nor the sense pulse drive signal 72, i.e., would instead select GND.

Controller 70 may detect that a low-load or no-load condition is true by measuring the frequency of sense pulses transferred through the power stage 35. Alternatively, it may utilize the magnitude information provided by a signed digital comparator or signed digital early/late detector to detect the disappearance (or reappearance) of the load. Once in skip mode, the logic in controller 70 intersperses sense pulses with no pulses, to maintain good regulation with an appropriate level of response to step changes in load without creating excessive audible noise. The process of interspersing sense pulses could be pseudo-random, e.g., employing a linear feedback shift register.

Figure 6:
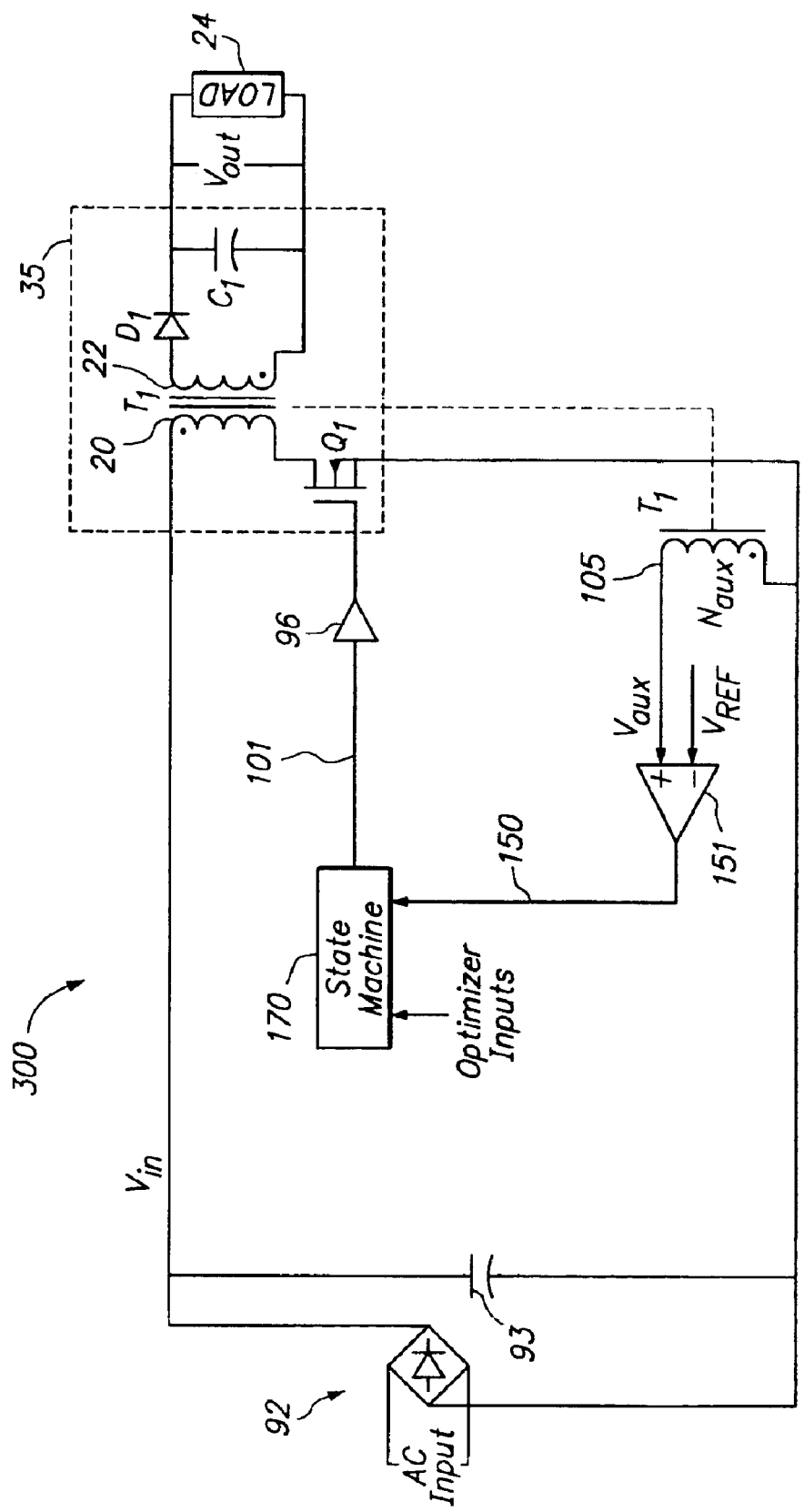
FIG. 6 illustrates an alternative embodiment of a pulse rate controlled flyback converter having primary-only feedback according to yet another embodiment of the invention.

Although shown separately in FIGS. 2 and 3, it will be appreciated that two or more of the pulse optimizer 85, power pulse generator 60, sense pulse generator 61 (if applicable), multiplexer 95 (if applicable), and pulse rate controller 70 may be implemented as software on a programmable processor, or may be formed by a single component. For example, the flyback converter 300 illustrated in FIG. 6, has the functions of pulse generation and pulse optimization formed by a state machine 170 fed by one or more binary comparators. The state machine 170 may contain a single pulse generator that may be commanded to produce either a sense pulse drive signal or a power pulse drive signal. In such an embodiment, there is no need for a multiplexer. Pulse timing may be supplied by optimizer logic, with the ON TIME and OFF TIME supplied by pulse rate controller logic. Should a skip mode be desired, the state machine 170 could simply command its pulse generator to not generate a sense pulse drive signal.

Figure 7:
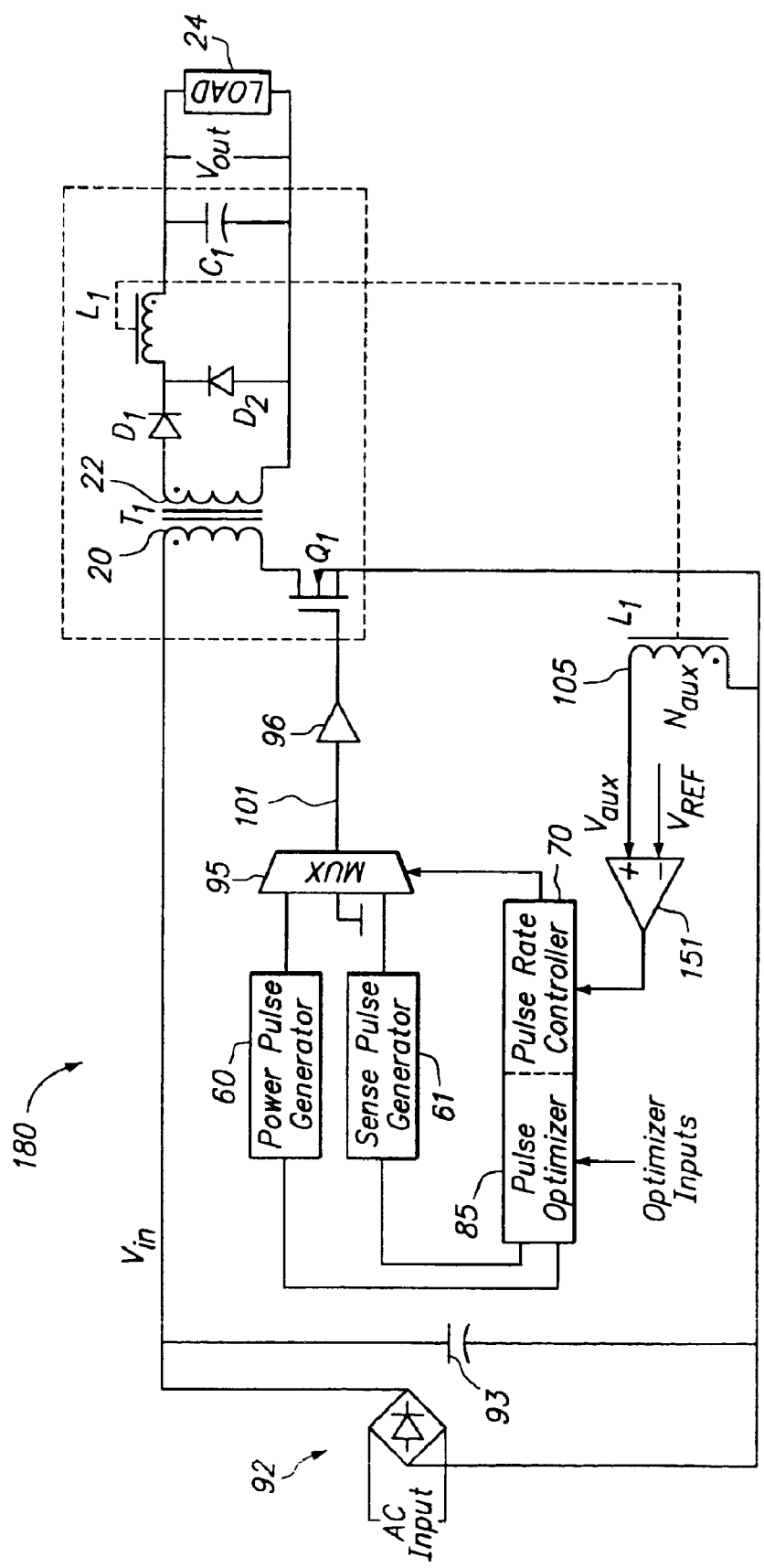
FIG. 7 illustrates a pulse rate controlled forward converter having primary-only feedback according to still another embodiment of the invention.

Although the above discussion has been with respect to flyback converters, it will be appreciated that primary-only feedback methods of the present invention may be implemented in other isolated power converters such as a forward converter. By way of illustration, FIG. 7 is a forward converter 180 in accordance with an embodiment of the invention. The pulse optimizer 85, power pulse generator 60, sense pulse generator 61, comparator 151, controller 70, multiplexer 95, and driver 96 serve the respective functions in converter 180 as described previously with respect to flyback converter 200 of FIG. 3. It will similarly be appreciated that in alternate embodiments two or more of the pulse optimizer 85, power pulse generator 60, sense pulse generator 61, multiplexer 95, and pulse rate controller 70 of converter 180 may be formed by a single component, such as a state machine, or as software on a programmable processor.

Notably, the output voltage of forward converter 180 is not reflected across the power transformer T1, as it is in a flyback converter. Instead, the reflected voltage of the output may be sensed via a primary-side auxiliary winding 105 magnetically coupled to an output inductor L1 located at the output of the rectifier diode D1. In this manner, the reflected voltage across the auxiliary winding 105 ($V_{AUX}$) provides an output voltage feedback signal for input to comparator 151. The sampling of $V_{AUX}$ preferably occurs at times when the current through the rectifying diode D1 is small and constant, sample to sample, as described above in detail.

Figure 8:
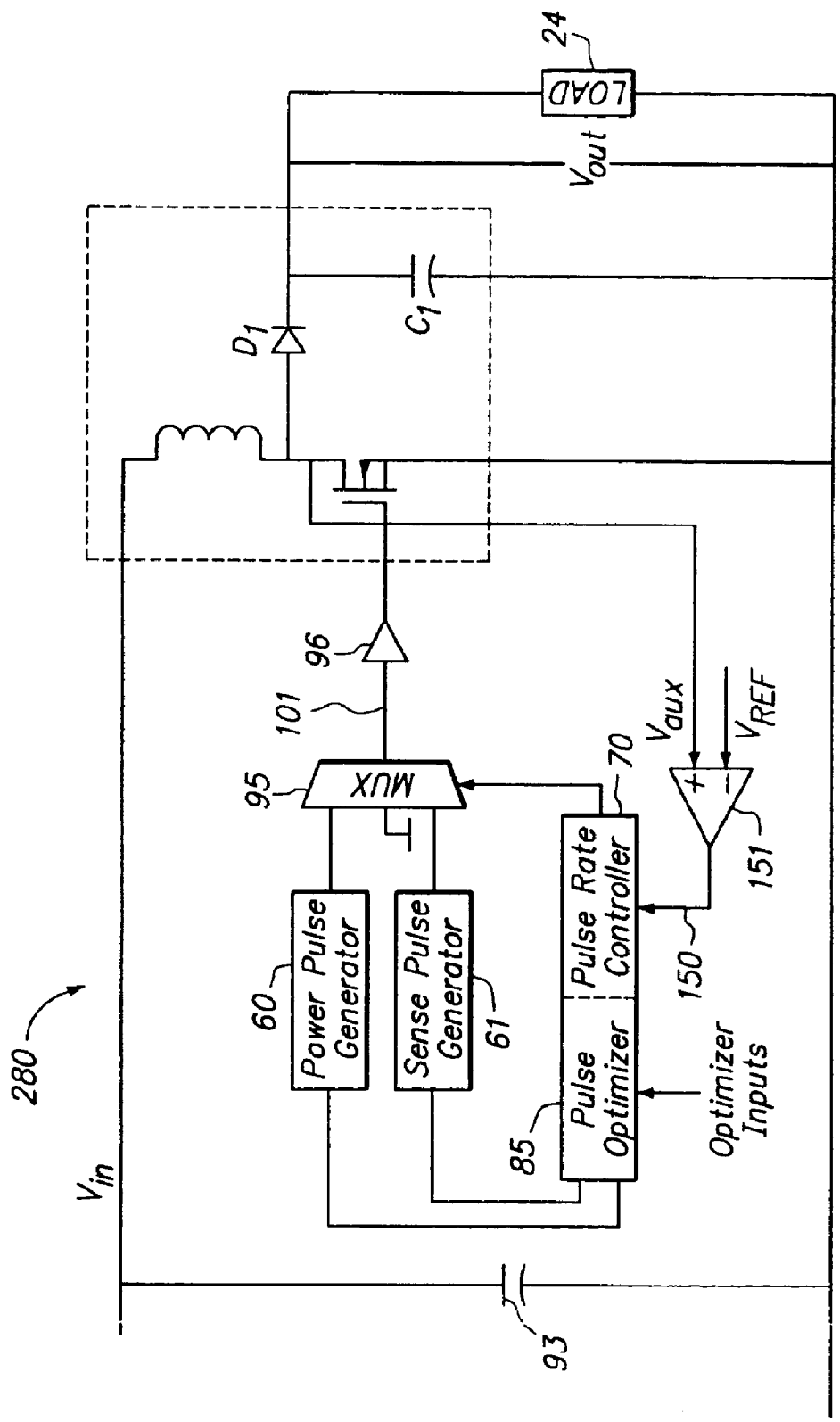
FIG. 8 illustrates a pulse rate controlled forward converter according to yet another embodiment of the invention.

The primary-only feedback method disclosed and described herein may also be extended to direct-coupled switching power converters. FIG. 8 illustrates a pulse rate regulated boost converter 280. The pulse optimizer 85, power pulse generator 60, sense pulse generator 61, comparator 151, controller 70, multiplexer 95, and driver 96 serve the same respective functions in converter 280 as in the transformer-coupled flyback and forward converters of FIGS. 3 and 7. Similarly, it will be appreciated that in alternate embodiments two or more of the pulse optimizer 85, power pulse generator 60, sense pulse generator 61, multiplexer 95, and pulse rate controller 70 of converter 280 may be formed by a single component, e.g., a state machine, or as software on a programmable processor. While the logic of the pulse optimizer 85 and pulse rate controller 70 in converter 280 may be different from that employed in flyback and forward converters, the above-described primary-only feedback method may nevertheless still be implemented, as shown in FIG. 8. In converter 280, the voltage across the switch Q1 during its OFF time provides a suitable approximation of the output voltage when sampled at those precisely determined instants for which the current through the rectifier diode D1 is small and constant, sample to sample, as described above in detail.

Figure 9:
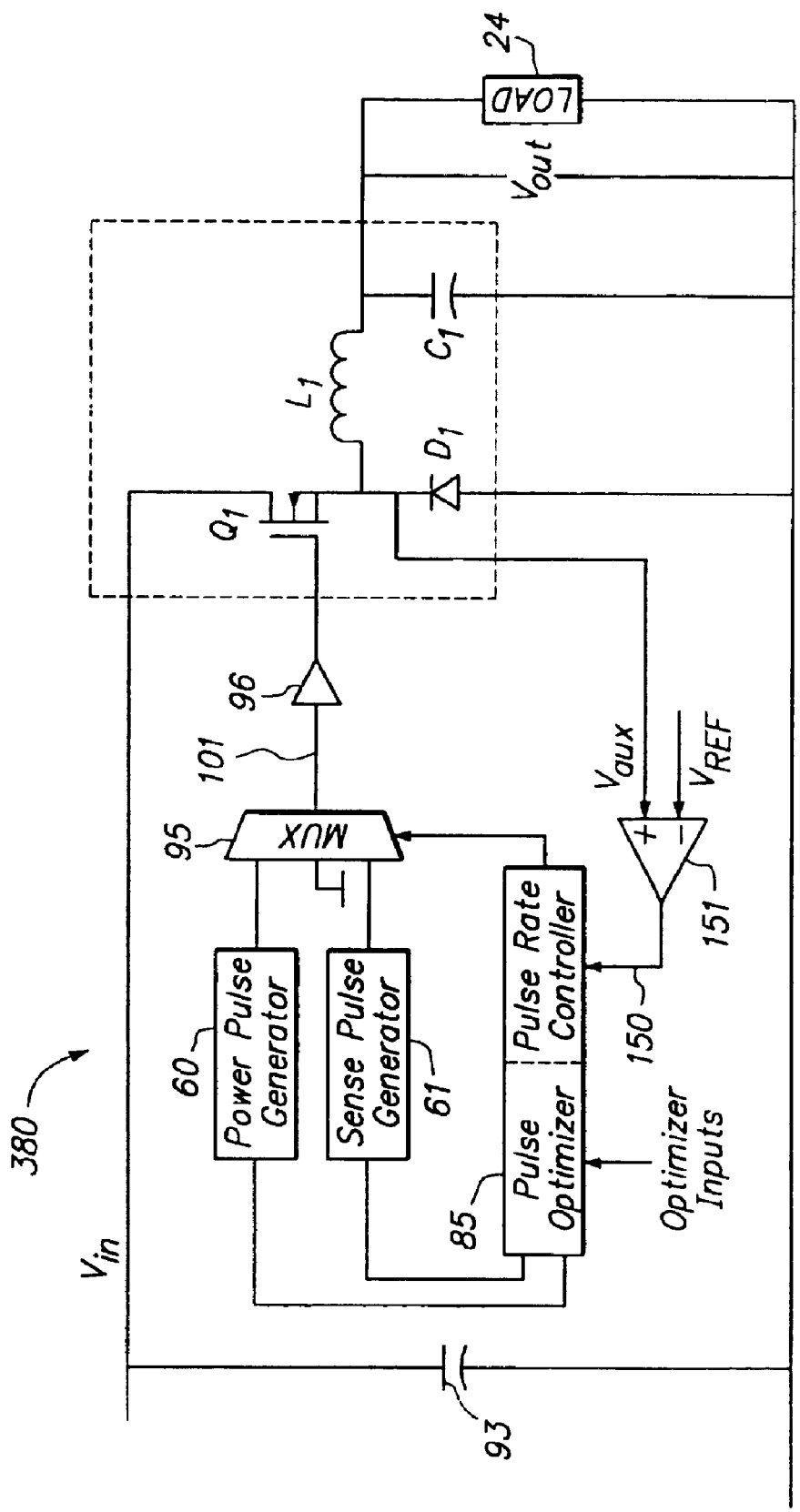
FIG. 9 illustrates a pulse rate controlled buck converter according to a still further embodiment of the invention.

FIG. 9 illustrates a pulse rate regulated buck converter. The pulse optimizer 85, power pulse generator 60, sense pulse generator 61, comparator 151, controller 70, multiplexer 95, and driver 96 serve the same respective functions in converter 380 as in the transformer-coupled converters 200 (FIG. 3) and 180 (FIG. 7). Similarly, in alternate embodiments two or more of these components may be implemented as a single component, e.g., as a state machine, or as software on a programmable processor. Those skilled in the art will appreciate that while the logic of the respective pulse optimizer 85 and pulse rate controller 70 in converter 380 may be different from that employed in flyback or forward converters, a primary-only feedback method for optimized regulation of converter 380 may nevertheless be implemented, as shown in FIG. 9.

In particular, in converter 380 the differential voltage across the output inductor L1 during the OFF time of the switch Q1 provides a suitable approximation to the output voltage when sampled at those precisely determined instants for which the current through the rectifier diode D1 is small and constant, sample to sample, as described in detail above.

Specific embodiments illustrating various aspects and features of the invention have been shown by way of example in the drawings and are herein described in detail. However, it is to be understood that the invention is not to be limited to the particular embodiments or methods shown or described, but to the contrary, the invention broadly cover all modifications, equivalents, and alternatives encompassed by the scope of the appended claims and their equivalents.

What is claimed:

1. A method of regulating voltage at an output of a switching cower converter, the converter comprising a switch and pulse generation circuitry, the pulse generation circuitry producing one or more drive signals for cycling the switch ON and OFF to transfer power from a source to a load, the method comprising:

sensing an output voltage feedback signal;

comparing the sensed feedback signal to a reference at a determined time during the cycling of the switch; and regulating an output voltage at the load by controlling whether a cycle of one of the drive signals cycles the switch in response to the comparison, the step of regulating the output voltage including:

producing a first drive signal using a first pulse generator of the pulse generation circuitry for cycling the switch ON and OFF, wherein if the switch is cycled ON and OFF according to a cycle of the first drive signal, a power pulse is transferred from the source to the load, and producing a second drive signal using a second pulse generator of the pulse generation circuitry for cycling the switch ON and OFF, wherein if the switch is cycled ON and OFF according to a cycle of the second drive signal, a sense pulse is transferred from the source to the load, the power transferred to the load by the sense pulse being substantially less than the power transferred to the load by the power pulse, wherein the cycling of the switch is enabled by a cycle of the power pulse, the sense pulse, or neither, in response to the comparison, and the comparison of the sensed feedback signal to the reference made during one or more previous switch cycles is taken into account in determining whether to enable the cycle of the power pulse, the sense pulse, or neither, to cycle the switch in response to a present comparison.

2. A method of regulating voltage at an output of a switching power converter, the converter comprising a switch and pulse generation circuitry, the pulse generation circuitry producing one or more drive signals for cycling the switch ON and OFF to transfer power from a source to a load, the method comprising:

sensing an output voltage feedback signal originating from a primary side of the converter, the sensed feedback signal approximating an output voltage at the load;

comparing the sensed feedback signal to a reference at an instant when the sensed feedback signal corresponds to the output voltage plus a small, substantially constant voltage drop measured from cycle to cycle of the switch; and regulating the output voltage by controlling whether a cycle of one of the drive signals cycles the switch in response to the comparison, the step of regulating the output voltage including:

producing a first drive signal using a first pulse generator of the pulse generation circuitry for cycling the switch ON and OFF, wherein if the switch is cycled ON and OFF according to a cycle of the first drive signal, a power pulse is transferred from the source to the load, and producing a second drive signal using a second pulse generator of the pulse generation circuitry for cycling the switch ON and OFF, wherein if the switch is cycled ON and OFF according to a cycle of the second drive signal, a sense pulse is transferred from the source to the load, the power transferred to the load by the sense pulse being substantially less than the power transferred to the load by the power pulse, wherein the cycling of the switch is enabled by a cycle of the power pulse, the sense pulse, or neither, in response to the comparison, and the comparison of the sensed feedback signal to the reference made during one or more previous switch cycles is taken into account in determining whether to enable the cycle of the power pulse, the sense pulse, or neither, to cycle the switch in response to a present comparison.

* * * * *

UNITED STATES PATENT AND TRADEMARK OFFICE
CERTIFICATE OF CORRECTION

PATENT NO. : 6,894,911 B2
DATED : May 17, 2005
INVENTOR(S) : Mark D. Telefus et al.

It is certified that error appears in the above-identified patent and that said Letters Patent is hereby corrected as shown below:

Column 11,
Line 49, delete "cower" and insert -- power --.

Signed and Sealed this

Twenty-third Day of August, 2005

JON W. DUDAS
*Director of the United States Patent and Trademark Office*